US009224318B2

(12) United States Patent
    Liu et al.

(10) Patent No.: US 9,224,318 B2
(45) Date of Patent: Dec. 29, 2015

(54) LIGHT SOURCE MODULE

(71) Applicants: Hung-Wei Liu, Hsin-Chu (TW); Chin-Ku Liu, Hsin-Chu (TW)

(72) Inventors: Hung-Wei Liu, Hsin-Chu (TW); Chin-Ku Liu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 56 days.

(21) Appl. No.: 14/321,819

(22) Filed: Jul. 2, 2014

(65) Prior Publication Data

US 2015/0192268 A1    Jul. 9, 2015

(30) Foreign Application Priority Data

Jan. 8, 2014    (CN) .......................... 2014 1 0008151

(51) Int. Cl.
    *G09F 13/00*    (2006.01)
(52) U.S. Cl.
    CPC ...................................... *G09F 13/00* (2013.01)
(58) Field of Classification Search
    CPC ......... F21V 5/002; F21V 7/0008; F21V 7/09;
        F21V 7/0025; F21V 13/04; G02B 6/0031;
        G02B 6/0053; G02B 6/0051; G02B 6/0055;
        G02B 6/0073; G02F 1/1335; G09F 13/00;
        F21Y 2101/02; F21Y 2103/003
    See application file for complete search history.

(56) References Cited

U.S. PATENT DOCUMENTS

| 5,863,114 | A  | * | 1/1999  | Nagatani ............. | F21V 5/02 |
|           |    |   |         |                     | 362/23.16 |
| 6,742,914 | B2 | * | 6/2004  | Prodell ............... | F21V 5/002 |
|           |    |   |         |                     | 362/245   |
| 7,229,198 | B2 | * | 6/2007  | Sakai ................ | G02B 6/0096 |
|           |    |   |         |                     | 362/225   |
| 7,293,899 | B2 | * | 11/2007 | Boyd ................. | G02B 6/0031 |
|           |    |   |         |                     | 362/19    |
| 8,500,308 | B2 | * | 8/2013  | Sato ................. | F21V 7/0025 |
|           |    |   |         |                     | 362/19    |
| 2007/0147036 | A1 | * | 6/2007 | Sakai ............... | G02B 6/0096 |
|           |    |   |         |                     | 362/240   |
| 2011/0096529 | A1 | * | 4/2011 | Wheatley ........... | G02B 6/0046 |
|           |    |   |         |                     | 362/97.1  |

FOREIGN PATENT DOCUMENTS

| JP | EP 0650010 A1 * | 4/1995  | ............... F21S 8/00 |
| TW | 569067          | 1/2004  |
| TW | M263519         | 5/2005  |
| TW | 200907229       | 2/2009  |
| TW | I332596         | 11/2010 |
| TW | 201205001       | 2/2012  |
| TW | M444487         | 1/2013  |
| TW | I390303         | 3/2013  |

* cited by examiner

*Primary Examiner* — Hargobind S Sawhney
(74) *Attorney, Agent, or Firm* — Jianq Chyun IP Office

(57) ABSTRACT

A light source module including an optical film, a bottom reflector, a top reflector, a light converging element, and a light emitting element is provided. The bottom reflector is located under the optical film. The top reflector and the light converging element are located at opposite sides of the optical film. The optical film, the bottom reflector, the top reflector, and the light converging element enclose a space. The light converging element has a first portion, a second portion, and a third portion. The light emitting element is disposed in the space and has an optical axis direction, where the third portion has a first surface facing the first portion, a first angle having a range of 5-10 degrees is included between the optical axis direction and a connection line between the light emitting element and one end of the first surface away from the light emitting element.

17 Claims, 5 Drawing Sheets

LIGHT SOURCE MODULE

CROSS-REFERENCE TO RELATED APPLICATION

This application claims the priority benefit of China application serial no. 201410008151.1, filed on Jan. 8, 2014. The entirety of the above-mentioned patent application is hereby incorporated by reference herein and made a part of this specification.

BACKGROUND

1. Technical Field

The invention relates to an optical module. Particularly, the invention relates to a light source module adapted to a display apparatus.

2. Related Art

Light source modules applied to display apparatuses are mainly divided into direct type light source modules and side type light source modules. Regarding the direct type light source module, light emitting elements can be used in collaboration with a secondary optical lens to provide a uniform planar light source. The secondary optical lens is used for reducing the number of used light emitting elements (for example, the number of used light emitting diodes) and for decreasing a whole thickness of the light source module, which is more in line with demands of energy-saving and carbon reduction, lightweight and thin thickness on products in the market. However, since the cost of the secondary optical lens is relatively high, the direct type light source module has the disadvantage of high cost. On the other hand, there is another type of the direct type light source module without using the secondary optical lens, and compared to the design that the light emitting elements are used in collaboration with the secondary optical lens, the secondary optical lens is saved, and the structure of such light source module is relatively simple and the cost thereof is lower. However, the number of the used light emitting elements of such direct type light source module is greater, which is liable to decrease system reliability, and since a certain light mixing distance has to be maintained, the whole thickness of the light source module is hard to be decreased.

As shown in FIG. 1A and FIG. 1B, recently, a direct type light source mode mainly composed of a light emitting element 10, a reflective lamp cover 20, a diffusion plate 30, and a bottom reflector 40 is developed, in which the reflective lamp cover 20 reflects a light beam emitted by the light emitting element 10 to the bottom reflector 40, and the bottom reflector 40 reflects the light beam to the diffusion plate 30 to emit light. According to such structure design, since the secondary optical lens and the light guide plate are omitted, the light source module has lower cost and thinner thickness, and has higher competitiveness. However, the existing reflective lamp cover has an uneven light emitting effect, and a main reason thereof is that a part of the light beam emitted by the light emitting element 10 may directly enter the diffusion plate 30 to emit out. Since such part of the light beam directly emits out without being functioned (for example, diffused) by the bottom reflector 40, a light intensity thereof is concentrated, which is liable to produce a bright band at a corresponding region 30a of the diffusion plate 30. Particularly, under a structure of a large-size light source module, the light beam that directly enters the diffusion plate 30 for emitting out is liable to emit out at the region 30a adjacent to the light emitting element 10, such that the bright band phenomenon of the diffusion plate 30 at the region 30a adjacent to the light emitting element 10 becomes more obvious. As shown in FIG. 1B, under the structure of the large-size light source module, the position of the region 30a of the diffusion plate 30 where the bright band is produced is approximately spaced by a distance D from one end of the diffusion plate 30 adjacent to the light emitting element 10, and the distance D is about ⅛ to ⅜ of a width T of the diffusion plate 30.

According to the existing technique, the bright band phenomenon is mitigated by extending a width of an upper half of the reflective lamp cover or increasing a height of the upper half of the reflective lamp cover. However, extension of the width of the upper half of the reflective lamp cover may decrease light emitting efficiency of the light source module and causes increase of invalid region, and increase of the height of the upper half of the reflective lamp cover may increase a whole thickness of the light source module. Therefore, how to resolve the bright band problem while maintaining the existing advantages (for example, a thin thickness) of the direct type light source module is an important issue to be developed.

Taiwan Patent No. 569067 discloses an arc reflective plate having protruding structures at upper and lower inner surfaces for eliminating or decreasing an edge bright band. Taiwan Patent No. I332596 discloses a reflective lamp cover including micro protruding structures for reducing light leakage at a bonding surface. Taiwan Patent No. M263519 discloses an implementation for extending a width of a lamp cover to prevent generating a bright band. Taiwan Patent No. M444487U1 and Taiwan Patent Publication No. 200907229 and 201205001A1 respectively disclose different reflective lamp covers, and Taiwan Patent No. I390303B1 discloses a bottom reflector of a light source module.

SUMMARY

The invention is directed to a light source module, which is capable of mitigating a bright band problem under a thin thickness.

Other objects and advantages of the invention can be further illustrated by the technical features broadly embodied and described as follows.

In order to achieve at least one of the objects or other objects, an embodiment of the invention provides a light source module including an optical film, a bottom reflector, a top reflector, a light converging element, and a light emitting element. The bottom reflector is located under the optical film. The top reflector is located at a side of the bottom reflector and the optical film. The light converging element is located at another side of the bottom reflector and the optical film relative to the top reflector. The optical film, the bottom reflector, the top reflector, and the light converging element enclose a space. A direction from the top reflector to the light converging element is defined as a reference direction. The light converging element has a first portion, a second portion, and a third portion. The first portion and the second portion respectively extend from one side of the bottom reflector and one side of the optical film along the reference direction, and are connected to each other at a side away from the top reflector. The third portion is connected to a surface of the second portion adjacent to the optical film, and the third portion protrudes towards the first portion from the surface. The light emitting element is disposed in the space and is located beside a junction of the first portion and the second portion, and the light emitting element has an optical axis direction, where the third portion has a first surface facing the first portion, a first angle is included between the optical axis direction and a connection line between the light emitting element and one end of the first surface away from the light emitting element, and the first angle is within a range between 5 degrees and 10 degrees.

In an embodiment of the invention, the end of the first surface away from the light emitting element is spaced by a first distance from the light emitting element along a direction parallel to the optical axis direction, and one end of a surface of the first portion facing the third portion adjacent to the bottom reflector is spaced by a second distance from the light emitting element along the direction parallel to the optical axis direction, and a ratio between the first distance and the second distance is within a range of 0.5 to 1.

In an embodiment of the invention, a second angle is included between the optical axis direction and a connection line between the light emitting element and one end of a surface of the first portion facing the third portion adjacent to the bottom reflector, and the second angle is within a range between 10 degrees and 20 degrees.

In an embodiment of the invention, the first surface is composed of one or a plurality of planes, composed of one or a plurality of curved surfaces, or composed of at least one plane and at least one curved surface.

In an embodiment of the invention, the first surface is a light absorbing surface, a diffusion surface, a specular surface or a combination of at least two of the above surfaces.

In an embodiment of the invention, the third portion further has a second surface connected to the first surface and facing the top reflector, where an acute angle is included between the second surface and the optical film, and the second surface is located between the first surface and the optical film.

In an embodiment of the invention, the second surface is a diffusion surface, a specular surface or a combination thereof.

In an embodiment of the invention, the bottom reflector has a first end and a second end opposite to the first end, where the second end is adjacent to the optical film, the light converging element is located at the first end, and the top reflector is located at the second end.

In an embodiment of the invention, the first end has at least one protrusion portion, and the protrusion portion protrudes towards the optical film.

In an embodiment of the invention, a distance between a vertex of the protrusion portion and the optical film is substantially identical to a distance between one end of the first portion adjacent to the protrusion portion and the optical film.

In an embodiment of the invention, one end of a surface of the first portion facing the third portion adjacent to the bottom reflector is spaced by a second distance from the light emitting element along a direction parallel to the optical axis direction, the vertex of the protrusion portion is spaced by a third distance from the end of the surface of the first portion facing the third portion adjacent to the bottom reflector along the direction parallel to the optical axis direction, and the third distance is smaller than a half of the second distance.

In an embodiment of the invention, a protrusion height of the protrusion portion is within a range of 1 mm to 2 mm, and a width of the protrusion portion on the bottom reflector is within a range of 5 mm to 10 mm.

In an embodiment of the invention, the optical film includes at least one diffusion sheet.

In an embodiment of the invention, the space is filled with air.

In an embodiment of the invention, an angle included between the top reflector and the optical film within the space is between 90 degrees and 100 degrees.

In an embodiment of the invention, a first section line of the surface of the first portion and a second section line of the surface of the second portion facing each other on a reference plane formed by the optical axis direction and a direction perpendicular to the optical film are non-spherical curves, and both of the first section line and the second section line satisfy an equation:

$$z = \frac{y^2/R}{1 + \sqrt{1-(1+K)y^2/R^2}} + \sum_{n=2}^{10} A_{2n} y^{2n},$$

where a z-direction is the optical axis direction, a y-direction is a direction perpendicular to the optical film, K is a spherical coefficient, R is a radius of curvature, $A_{2n}$ is a coefficient of $y^{2n}$, and n is a positive integer greater than or equal to 2 and smaller than or equal to 10, and R is a non-zero constant.

In an embodiment of the invention, K in the aforementioned equation is within a range between −1 and −10, and $A_4$ is within a range between 0 and 0.1.

According to the above descriptions, in the light source module of the invention, since the light guide plate and the secondary optical lens are saved, the light source module has a thin thickness and lower cost. Moreover, based on the design of the third portion of the light converging element in the light source module of the invention, a part of light beam come from the light emitting element and/or the second portion is shielded, so as to decrease a chance that the light beam directly emits out from the region of the optical film close to the light emitting element. Therefore, under the relatively thin thickness, the light source module of the invention can mitigate a bright band problem occurred at the region of the optical film adjacent to the light emitting element due to direct emission of the light beam. In addition, through the design of the oblique second surface of the third portion of the light converging element, a width of a frame border is further decreased to achieve a slim border effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2A:
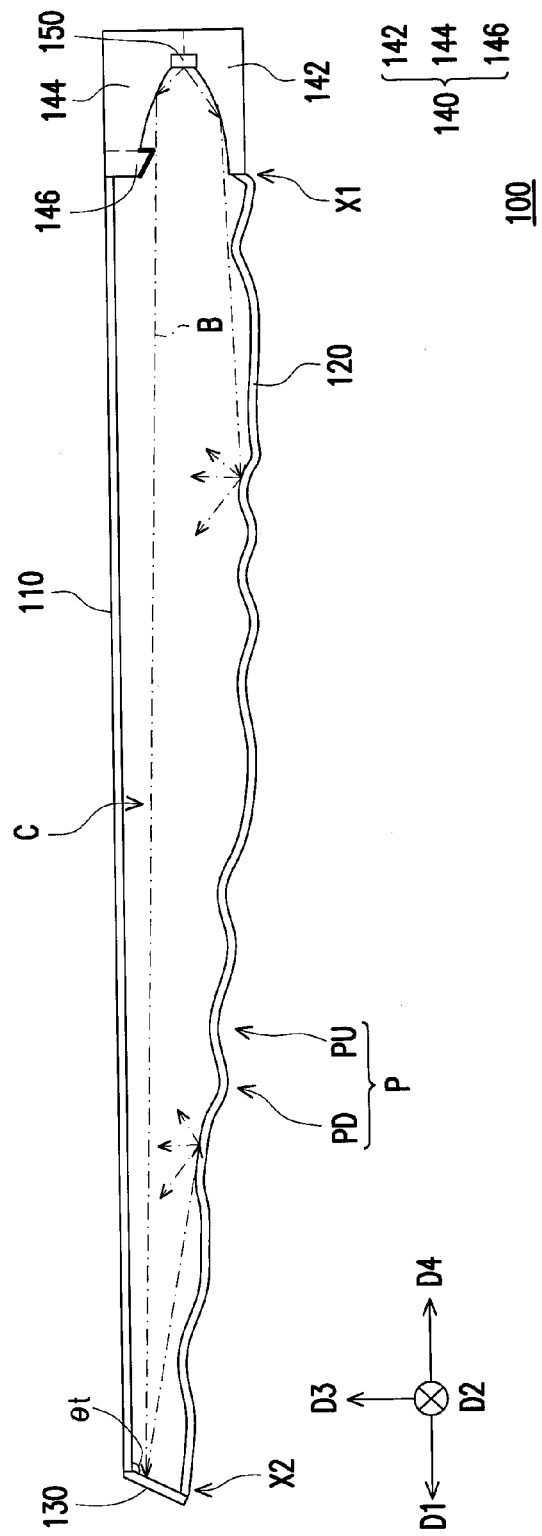
FIG. 2A is a cross-sectional view of a light source module according to an embodiment of the invention.
Figure 2B:
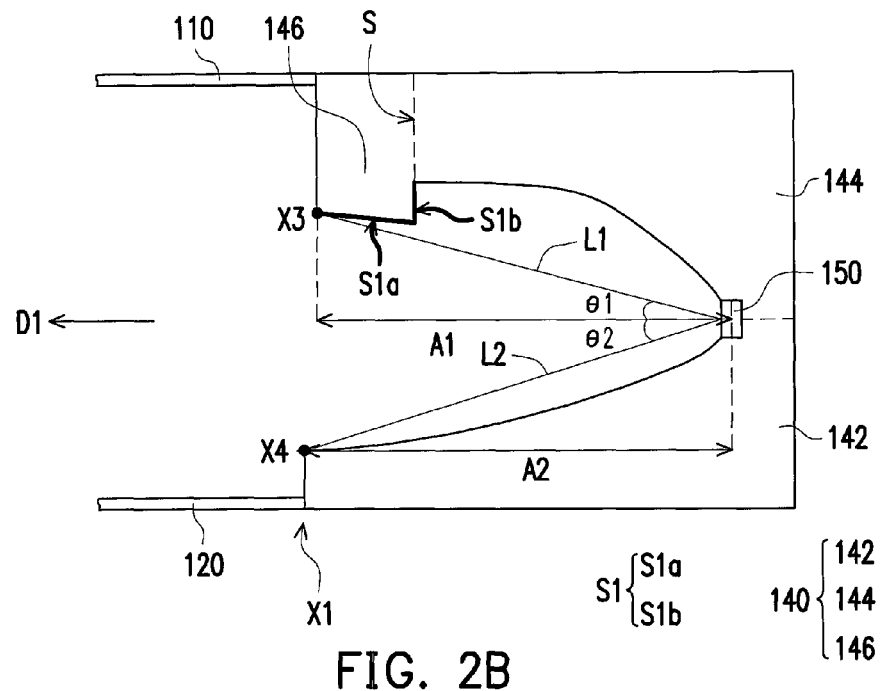
FIG. 2B is a partial enlarged view of FIG. 2A.

FIG. 2A is a cross-sectional view of a light source module according to an embodiment of the invention. FIG. 2B is a partial enlarged view of FIG. 2A. Referring to FIG. 2A and FIG. 2B, the light source module 100 of the embodiment includes an optical film 110, a bottom reflector 120, a top reflector 130, a light converging element 140, and a light emitting element 150.

The bottom reflector 120 is located under the optical film 110. The top reflector 130 is located at a side of the bottom reflector 120 and the optical film 110. The light converging element 140 is located at another side of the bottom reflector 120 and the optical film 110 relative to the top reflector 130. The optical film 110, the bottom reflector 120, the top reflector 130, and the light converging element 140 enclose a space C. Different to a general light source module that transmits a light beam in a light guide plate, the light source module 100 of the embodiment transmits the light beam in the space C filled with a propagation medium of air, i.e. the space C is filled with air. Therefore, in the light source module 100 of the embodiment, configuration of the light guide plate is saved, such that the light source module 100 has lower cost.

The light emitting element 150 is disposed in the space C and is located at one side of the light converging element 140, and is used for emitting a light beam B towards the space C, where the light emitting element 150 has an optical axis direction D1. The light emitting element 150, for example, includes a plurality of light emitting diodes (LEDs), and the LEDs are, for example, arranged along a direction D2 substantially perpendicular to the normal direction D3 of optical film 110 and perpendicular to the optical axis direction D1. In another embodiment, the light emitting element 150 can also be a cold cathode fluorescent lamp (CCFL) to replace the LEDs, where the CCFL, for example, extends along the direction D2. In other embodiments, other suitable light sources can also be used to replace the LEDs or the CCFL, which is not limited by the invention.

The plane where the optical film 110 is located is a light emitting surface of the light source module 100. The optical film 110 includes at least one diffusion sheet to diffuse the light beam B, so as to improve uniformity of the planar light source provided by the light source module 100. In other embodiments, the light source module 100 may further include other optical film according to an actual requirement. For example, in the light source module 100, at least one prism sheet (not shown) can be disposed on the diffusion sheet to reduce a divergence angle of the light beam B, so as to improve a whole brightness of the light source module 100.

An area of an orthogonal projection of the bottom reflector 120 on the plane where the optical film 110 is located is greater than or equal to an area of the optical film 110, so as to ensure that the whole optical film 110 can receive the light beam B reflected by the bottom reflector 120. On the other hand, if the surface of the bottom reflector 120 facing the optical film 110 is designed as a diffusion surface, it avails diffusing the light beam B, such that the light beam B emitted from the optical film 110 is more uniform. The diffusion surface is, for example, formed by adhering a white reflector (for example, Toray E6D6) or through mold injection of a white plastic material (for example, Polycarbonate URC2500) or formed by vacuum forming a white plastic reflector, which is not limited by the invention.

The bottom reflector 120 has a first end X1 and a second end X2 opposite to the first end X1, where the second end X2 is adjacent to the optical film 110, the light converging element 140 is located at the first end X1, and the top reflector 130 is located at the second end X2. In the embodiment, the second end X2 is closer to the optical film 110 compared to the first end X1. In detail, a distance between the bottom reflector 120 and the optical film 110 along the direction D3 perpendicular to the optical film 110 is gradually decreased along the optical axis direction D1, i.e. the distance is gradually decreased from the side where the light converting element 140 is located towards the side where the top reflector 130 is located.

Moreover, in the embodiment, a plurality of continuous concave-convex structures P are configured on the bottom reflector 120 to fine-tune a brightness distribution of the planar light source provided by the light source module 100. In detail, each of the concave-convex structures P has a convex portion PU and a concave portion PD connected to the convex portion PU, and since the concave-convex structures P are connected in pairs and are continuously distributed, the brightness distribution of the planar light source provided by the light source module 100 of the embodiment has a continuous and smooth change, i.e. a brightness difference between the convex portion PU and the concave portion PD is not easy to be perceived. Compared to the existing technique of configuring discontinuous microstructures on a bottom surface of a light guide plate, or compared to a general direct type light source module in which a reflective surface is a discontinuous concave-convex curved surface, the continuous concave-convex structures P of the embodiment help the light source module 100 to provide a planar light source with better uniformity.

It should be noticed that the situation that the distance between the bottom reflector 120 and the optical film 110 along the direction D3 perpendicular to the optical film 110 is gradually decreased along the optical axis direction D1 is described in a macro perspective. Namely, the distance between the bottom reflector 120 and the optical film 110 along the direction D3 is approximately decreased along the optical axis direction D1 gradually, though it does not mean that the distance between the optical film 110 and any point on the bottom reflector 120 that is away from the light emitting element 150 along the direction D3 must be smaller than the distance between the optical film 110 and any point on the bottom reflector 120 that is closer to the light emitting element 150 along the direction D3. In detail, in case that the bottom reflector 120 is configured with the convex portion PU and the concave portion PD, the distance between the bottom reflector 120 and the optical film 110 along the direction D3 can also be locally increased or locally the same along with up and down of the adjacent convex portions PU and the concave portions PD.

The light converging element 140 has a first portion 142, a second portion 144, and a third portion 146. In the embodiment, the first portion 142, the second portion 144, and the third portion 146 are, for example, formed integrally, though the invention is not limited thereto. The first portion 142 and the second portion 144 respectively extend from one side of the bottom reflector 120 and one side of the optical film 110 along a reference direction D4, and are connected to each other at a side away from the top reflector 130, and the light emitting element 150 is located besides a junction of the first portion 142 and the second portion 144. The reference direction D4 is a direction from the top reflector 130 to the light converging element 140, the reference direction D4 is parallel to the optical axis direction D1 and is opposite to the optical axis direction D1.

The first portion 142 and the second portion 144 are used for propagating the light beam B emitted by the light emitting element 150 towards the first direction D1 approximately, and propagating the light beam B to a whole surface of the bottom reflector 120 facing the optical film 110. In detail, a part of the light beam B emitted by the light emitting element 150 is directly propagated to a region of the bottom reflector 120 close to the light emitting element 150, and emits out of the optical film 110 through a function (reflection, diffusion) of the bottom reflector 120. Moreover, another part of the light beam B emitted by the light emitting element 150 is first propagated to the first portion 142 and the second portion 144 of the light converging element 140, where a part of the light beam B reflected by the first portion 142 is propagated to the region of the bottom reflector 120 close to the light emitting element 150, and emits out of the optical film 110 through the function (reflection, diffusion) of the bottom reflector 120, and a part of the light beam B reflected by the second portion 144 is propagated to the top reflector 130 and a region of the bottom reflector 120 away from the light emitting element 150, and the top reflector 130 can reflect the light beam B to the region of the bottom reflector 120 away from the light emitting element 150, such that the light beam B emits out of the optical film 110 through the function (reflection, diffusion) of the bottom reflector 120.

In other words, the top reflector 130 can be regarded as a virtual light source, which is used for increasing a degree of freedom of the brightness distribution, such that the planar light source provided by the light source module 100 is more uniform. Therefore, a surface of the top reflector 130 facing the space C is preferably a specular surface. The specular surface is, for example, formed by adhering an enhanced specular reflector (ESR), a aluminum reflector or a silver reflector, or formed by plating a reflective thin film (for example, a aluminum material or a silver material) or through a combination of the above methods, which is not limited by the invention. Moreover, in order to ensure that the top reflector 130 propagates the light beam B to the bottom reflector 120 other than directly reflects the light beam B back to the light converging element 140, an angle θt included between the top reflector 130 and the optical film 110 within the space C is between 90 degrees and 100 degrees.

Moreover, in order to ensure that the first portion 142 and the second portion 144 respectively propagate the light beam B emitted by the light emitting element 150 to the aforementioned regions, the surface of the first portion 142 and the surface of the second portion 144 facing each other are preferably specular surfaces, and the specular surfaces can be formed through the aforementioned methods, and a detail thereof is not repeated.

In addition, the surface of the first portion 142 and the surface of the second portion 144 facing each other are designed into non-spherical curved surfaces, and radius of curvatures or other design parameters of the curved surfaces can be adjusted according to a size of the light source module 100 and the maximum space between the optical film 110 and the bottom reflector 120, etc., so as to obtain a more uniform brightness distribution.

In detail, a first section line of the surface of the first portion 142 and a second section line of the surface of the second portion 144 facing each other on a reference plane formed by the optical axis direction D1 and a direction D3 perpendicular to the optical film 110 are non-spherical curves, and both of the first section line and the second section line satisfy an equation:

$$z = \frac{y^2/R}{1 + \sqrt{1-(1+K)y^2/R^2}} + \sum_{n=2}^{10} A_{2n} y^{2n},$$

where a z-direction is the optical axis direction D1, a y-direction is the direction D3 perpendicular to the optical film 110, K is a spherical coefficient, R is a radius of curvature, $A_{2n}$ is a coefficient of $y^{2n}$, and n is a positive integer greater than or equal to 2 and smaller than or equal to 10, and R is a non-zero constant.

In the embodiment, K falls within a range of −1 to −10, and $A_4$ falls within a range of 0 to 0.1. Moreover, the first portion 142 and the second portion 144 can be symmetric or asymmetric to each other. When the first portion 142 and the second portion 144 are symmetric to each other, the first section line and the second section line, for example, have the same values of R, K, and $A_4$. For example, when K=−1, $A_4$ is greater than or equal to 0.0001 and smaller than or equal to 0.1. Alternatively, when K=−1.1 to −10, $A_4$ is 0 or is greater than or equal to 0.0001 and smaller than or equal to 0.1, though the invention is not limited thereto. On the other hand, when the first portion 142 and the second portion 144 are asymmetric to each other (not shown); at least one of the values of R, K, and $A_4$ of the first section line and the second section line is different. For example, K and $A_4$ of the first section line are respectively −1.1 and 0, and K and $A_4$ of the second section line are respectively −1 and 0.001.

In a preferred exemplary embodiment, the surface of the first portion 142 and the surface of the second portion 144 facing each other are not parabolic curved surfaces, i.e. the first section line and the second section line do not cover the range of K=−1 and A4=0. In detail, the light converging element composed of the parabolic curved surfaces is liable to increase the whole thickness of the light source module and a border width thereof on the optical axis direction D1. Moreover, in the light converging element that converges the light beam through the parabolic curved surfaces (K=−1, A4=0), the light emitting element is generally disposed on a focus of the parabolic curved surfaces. Under a premise that the light emitting element is an ideal light source (i.e. an infinitesimal point light source), the light beam reflected by the parabolic curved surface is parallel to the optical axis direction D1. However, the light emitting element actually has a certain size and is not the ideal point light source, and the light beam reflected by the parabolic curved surface is not substantially parallel to the optical axis direction D1, such that the parabolic curved surfaces cannot effectively ameliorate the bright band phenomenon of the region close to the light source. On the other hand, if the light beams reflected by the parabolic curved surfaces are all collimated beams, the light beams are only distributed on a local region of the bottom reflector 120 to cause an uneven light emitting effect. Therefore, the surface of the first portion 142 and the surface of the second portion 144 facing each other are preferably designed into non-spherical curved surfaces of non-parabolic curved surfaces, and such surface design not only avails mitigating the bright band phenomenon of the light source module 100 at the region adjacent to the light converging element 140, but also helps improving the light emitting uniformity of the light source module 100.

Figure 1A:
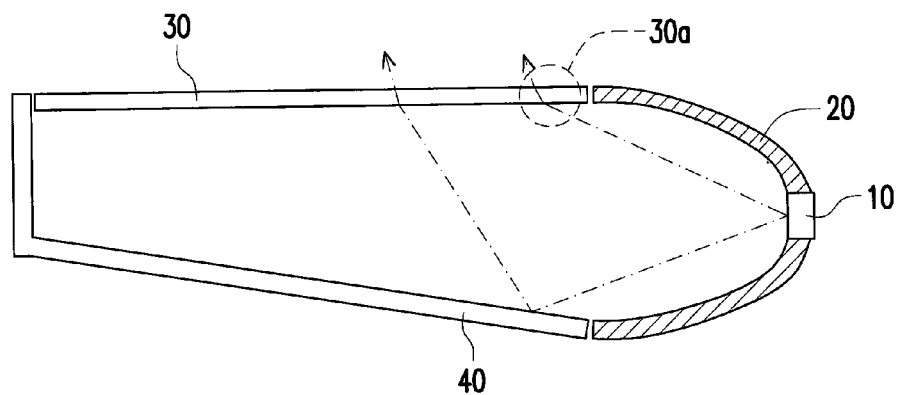
FIG. 1A is a cross-sectional view of a conventional light source module.
Figure 1B:
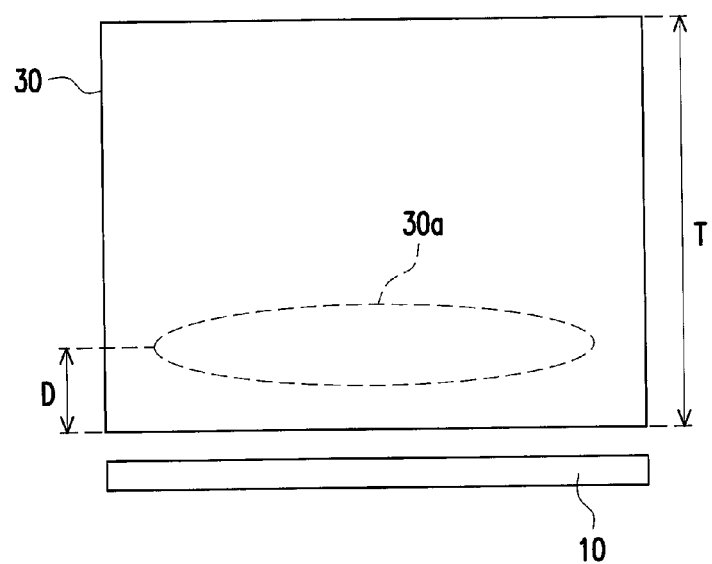
FIG. 1B is a top view of FIG. 1A.

On the other hand, the third portion 146 of the light converging element 140 is connected to the surface S of the second portion 144 adjacent to the optical film 110, and the third portion 146 protrudes towards the first portion 142 from the surface S. The third portion 146 is mainly used to mitigate the situation that a part of the light beam B emitted by the light emitting element 150 directly emits out of the optical film 110 at the region close to the light emitting element 150 to cause the bright band phenomenon at the region on the optical film 110 close to the light emitting element 150. The region on the optical film 110 close to the light emitting element 150 where the bright band phenomenon is occurred refers to a region 30a in FIG. 1B. Therefore, the design of the third portion 146 can resolve the bright band phenomenon of the existing technique.

The third portion 146 has a first surface S1 facing the first portion 142, where a first angle $\theta_1$ is included between the optical axis direction D1 and a connection line L1 between the light emitting element 150 and one end X3 of the first surface S1 away from the light emitting element 150. The greater the first angle $\theta_1$ is, the less the third portion 146 shields the light beam B of the light emitting element 150 that directly emits out of the optical film 110, and the bright band phenomenon is not effectively mitigated. Conversely, the smaller the first angle $\theta_1$ is, the more the third portion 146 shields the light beam B, though excessively small first angle $\theta_1$ probably results in inadequate brightness of the optical film 110 at the region adjacent to the top reflector 130. Therefore, the first angle $\theta_1$ of the embodiment is within a range between 5 degrees and 10 degrees, by which while the bright band phenomenon is mitigated, the brightness required by the optical film 110 at the region adjacent to the top reflector 130 is also maintained.

Moreover, the light shielding effect of the third portion 146 is varied along with variation of a distance between the third portion 146 and the light emitting element 150 along a direction parallel to the optical axis direction D1. In detail, the end X3 of the first surface S1 away from the light emitting element 150 is spaced by a first distance A1 from the light emitting element 150 along the direction parallel to the optical axis direction D1, and one end X4 of a surface of the first portion 142 facing the third portion 146 adjacent to the bottom reflector 120 is spaced by a second distance A2 from the light emitting element 150 along the direction parallel to the optical axis direction D1. If the second distance A2 is maintained unchanged, the smaller the first distance A1 is, i.e. the smaller the width of the second portion 144 along the direction parallel to the optical axis direction D1 is, the smaller the region of the second portion 144 capable of reflecting the light beam B is, and the worse the light efficiency is. Conversely, the greater the first distance A1 is, the larger the border width of the light converging element 140 along the direction parallel to the optical axis direction D1 is, and the larger an invalid area of the light source module 100 is, which influences an appearance of the light source module 100.

On the other hand, if the first distance A1 is maintained unchanged, the larger the second distance A2 is, the easier the first portion 142 reflects the light beam B near the first end X1 (adjacent to the light emitting element 150) to cause inadequate brightness of a region of the optical film 110 corresponding to the first end X1 (adjacent to the light emitting element 150). Conversely, the smaller the second distance A2 is, the easier the region of the optical film 110 corresponding to the first end X1 (adjacent to the light emitting element 150) has a phenomenon of excessive brightness. Further, referring to FIG. 1B, the region of the optical film 110 adjacent to the first end X1 (adjacent to the light emitting element 150) refers to a position on the optical film 110 spaced by a distance D (⅛ of the width T) from the light emitting element 150. Moreover, the excessive bright region of the optical film 110 adjacent to the first end X1 (adjacent to the light emitting element 150) is different to the position where the bright band phenomenon is occurred of the existing technique. Therefore, in the embodiment, a ratio between the first distance A1 and the second distance 2 is designed to be within a range of 0.5 to 1, by which while the bright band phenomenon is mitigated, the brightness required by the region of the optical film 110 adjacent to the first end X1 (adjacent to the light emitting element 150) and the border width are maintained.

Moreover, since the third portion 146 shields a part of the light beam B come from the light emitting element 150 and/or an upper half of the second portion 144 (i.e. the part of the light beam B adjacent to the second portion 144), and the brightness of the optical film 110 at the side away from the light emitting element 150 (adjacent to the second end X2) is partially contributed by the light beam B come from the upper half of the second portion 144, in the embodiment, by changing a second angle $\theta_2$ included between the optical axis direction D1 and a connection line L2 between the light emitting element 150 and the end X4 of the surface of the first portion 142 facing the third portion 146 adjacent to the bottom reflector 120, the brightness of the optical film 110 at the side away from the light emitting element 150 (adjacent to the second end X2) is compensated. In detail, if the second angle $\theta_2$ is too small, the first portion 142 is liable to reflect excessive light beam B to the side of the optical film 110 adjacent to the light emitting element 150 (adjacent to the first end X1) to cause the phenomenon of excessive brightness at the region of the optical film 110 corresponding to the first end X1. Conversely, if the second angle $\theta_2$ is too large, the light beam B come from the light emitting element 150 is easy to be directly incident to the bottom reflector 120, and directly emits out from the region of the optical film 110 corresponding to the first end X1 (adjacent to the light emitting element 150) to cause the phenomenon of excessive brightness at the region of the optical film 110 corresponding to the first end X1 as well. Therefore, in the embodiment, the second angle $\theta_2$ is designed to be within a range between 10 degrees and 20 degrees to balance the brightness of the optical film 110 at regions corresponding to the first end X1 and the second end X2, so as to improve uniformity of the planar light source provided by the light source module 100.

Moreover, the first surface S1 can be composed of one or a plurality of planes, composed of one or a plurality of curved surfaces, or composed of at least one plane and at least one curved surface. Moreover, the first surface S1 can be a light absorbing surface, a diffusion surface, a specular surface or a combination of at least two of the above surfaces. The diffusion surface is, for example, formed by adhering a white reflector (for example, Toray E6D6) or through mold injection of a white plastic material (for example, Polycarbonate URC2500) or formed by vacuum forming a white plastic reflector, which is not limited by the invention. The specular surface is, for example, formed by adhering an enhanced specular reflector (ESR), an aluminum reflector or a silver reflector, or formed by plating a reflective thin film (for example, a aluminum material or a silver material) or through a combination of the above methods, which is not limited by the invention. In detail, a surface characteristic (light absorbing, diffusion, specular, etc.) of the first surface S1 relates to the brightness of the optical film 110 at the side adjacent to the light emitting element 150. Therefore, in the embodiment, by changing the surface characteristic (light absorbing, diffusion, specular, etc.) of the first surface S1, the light beam B can be redistributed to ensure that the brightness of the optical film 110 at the region corresponding to the first end X1 to be similar to the brightness of the optical film 110 at the region corresponding to the second end X2, so as to improve the uniformity of the planar light source provided by the light source module 100. In detail, if the brightness of the optical film 110 at the side adjacent to the light emitting element 150 is too bright, the first surface S1 with the light absorption effect can be used to decrease the brightness of the optical film 110 at the side adjacent to the light emitting element 150. If the brightness of the optical film 110 at the side adjacent to the light emitting element 150 is inadequate, the first surface S1 with the diffusion or specular effect can be used to increased the brightness of the optical film 110 at the side adjacent to the light emitting element 150.

For example, as shown in FIG. 2B, the first surface S1 of the embodiment is composed of a plane S1*a* and a plane S1*b*, where the plane S1*a* and the plane S1*b* are connected to each other, and the plane S1*b* is connected between the plane S1*b* and the surface of the second portion 144 facing to the first portion 142. The plane S1*a* is, for example, oblique relative to the optical axis direction D1, and the plane S1*b* is, for example, perpendicular to the optical axis direction D1. The light beam B emitted from the light emitting element 150 with a large angle is easy to be propagated to the plane S1*b*, therefore, the plane S1*b* can be a light absorbing surface to absorb the light beam B emitted in a large angle, so as to prevent the light beam B emitting out of the optical film 110 from the side adjacent to the light emitting element 150. The light absorbing surface can be, for example, formed by a black material, or formed by spraying a light absorbing black coating material on the plane S1*b*. On the other hand, the plane S1*a* can be a diffusion surface for diffusing the light beam B propagated to the plane S1*a* to the first portion 142 or the bottom reflector 120, so as to improve the light utilization rate. However, implementation of the light converting element 140 of the invention is not limited thereto.

Figure 3A:
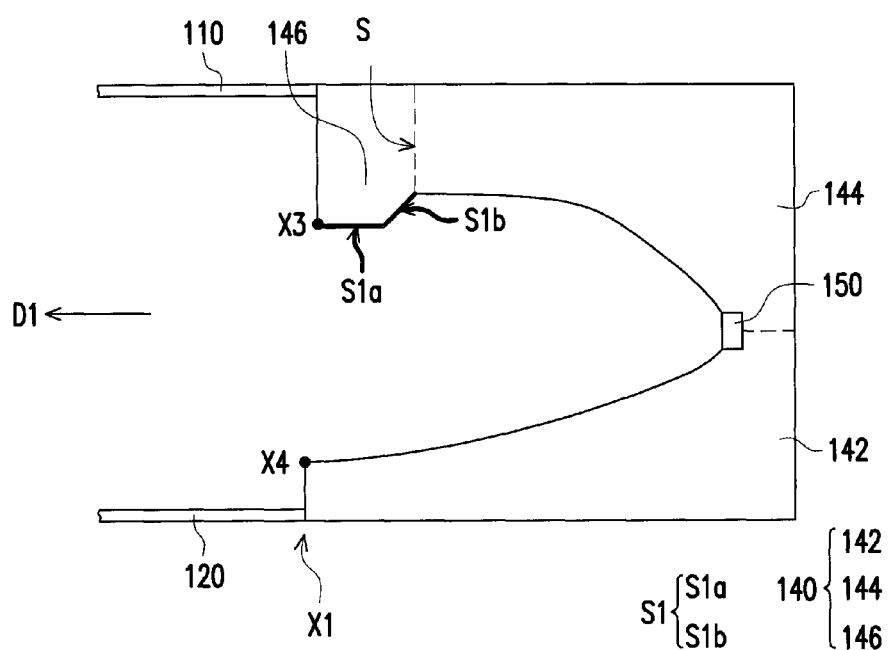
FIG. 3A to FIG. 3D are schematic diagrams illustrating other types of light converging elements according to an embodiment of the invention.
Figure 3B:
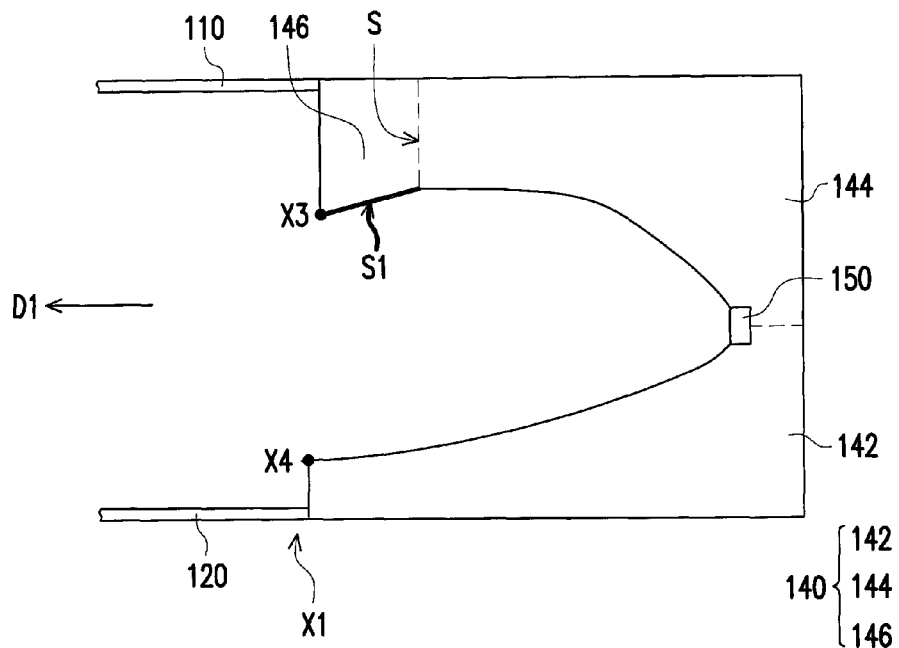
Figure 3C:
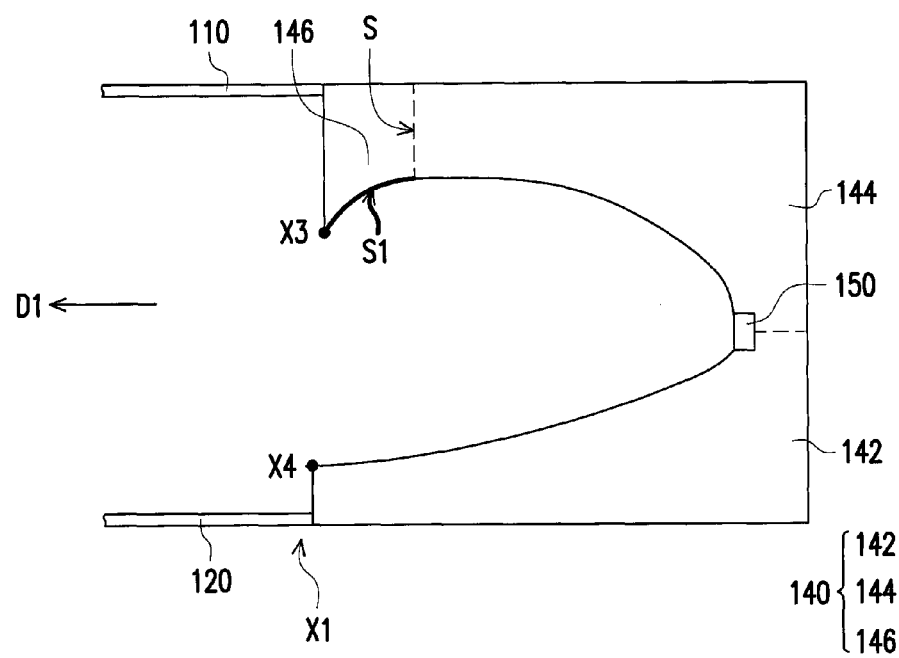

FIG. 3A to FIG. 3D are schematic diagrams illustrating other types of light converging elements according to an embodiment of the invention. As shown in FIG. 3A, the plane S1*a* can be substantially parallel to the optical axis direction D1, and the plane S1*b* can be oblique relative to the optical axis direction D1. As shown in FIG. 3B, the first surface S1 can also be composed of one plane, where the plane constructing the first surface S1 is, for example, oblique relative to the optical axis direction D1. Moreover, as shown in FIG. 3C, the first surface S1 can also be composed of one curved surface.

Figure 3D:
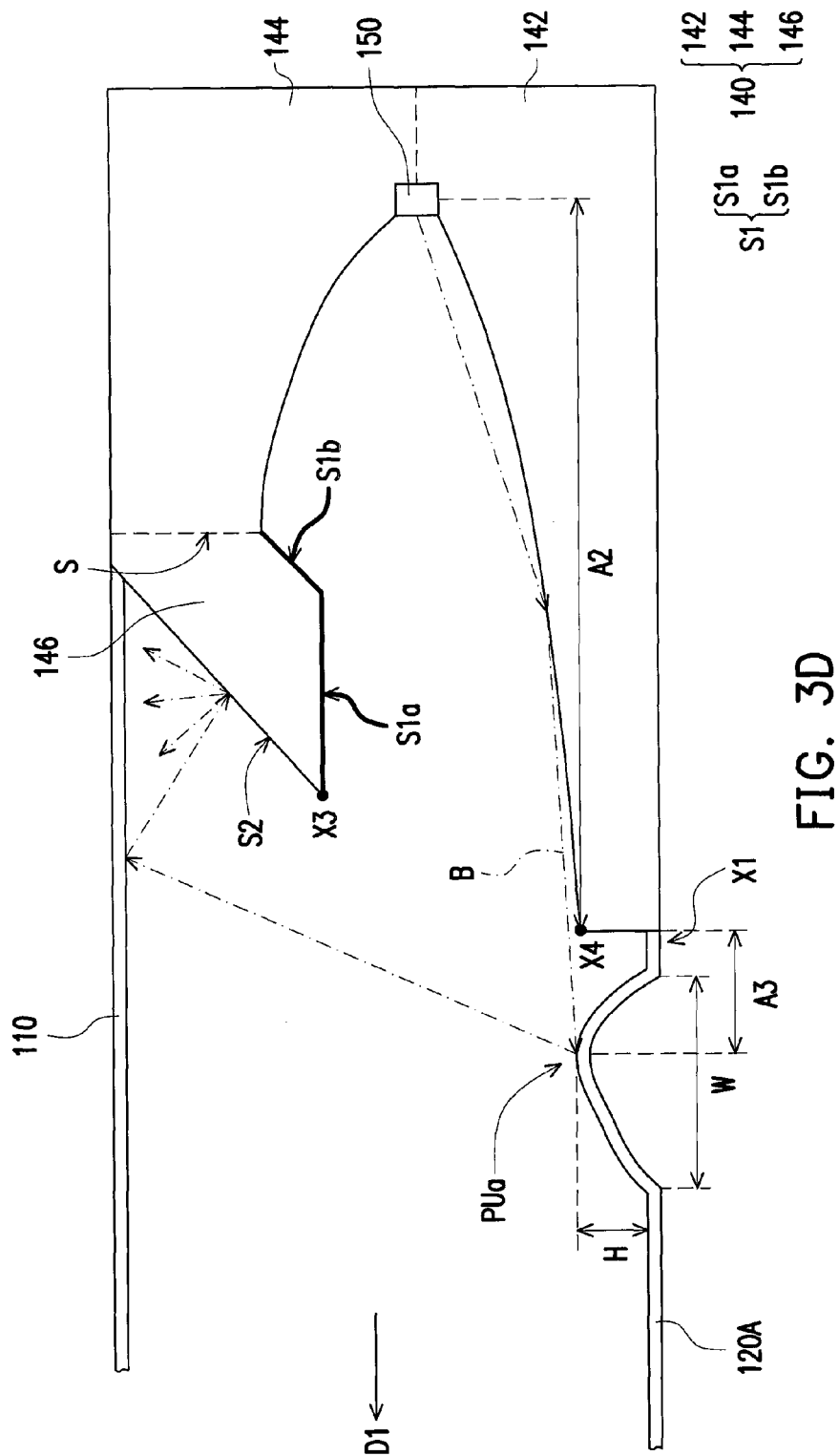

Moreover, as shown in FIG. 3D, the third portion 146 may further has a second surface S2 connected to the first surface S1 and facing to the top reflector 130 (shown in FIG. 2A), where an acute angle is included between the second surface S2 and the optical film 110, and the second surface S2 is located between the first surface S1 and the optical film 110. Through the design of the oblique second surface S2, a width of frame border along the optical axis direction D1 is further decreased to achieve a slim border effect.

However, since an oblique direction of the second surface S2 is opposite to the light emitting direction of the light emitting element 150, the optical film 110 may have a dark area at the region corresponding to the second surface S2. Therefore, in the embodiment, the first end X1 of the bottom reflector 120A may selectively have at least one protrusion portion PUa, and the protrusion portion PUa protrudes towards the optical film 110. The protrusion portion PUa reflects the light beam B come from the first portion 142 and/or the light beam B directly propagated to the protrusion portion PUa to the dark area above the second surface S2 to increase the brightness of the dark area. Moreover, the second surface S2 may have a reflective property, which is, for example, a diffusion surface, a specular surface or a combination thereof, so as to improve the utilization rate of the light beam B at the dark area to further increase the brightness of the dark area.

Moreover, a vertex of the protrusion portion PUa is spaced by a third distance A3 from the end X4 of the surface of the first portion 142 facing the third portion 146 adjacent to the bottom reflector 120A along a direction parallel to the optical axis direction D1. To ensure the protrusion portion PUa reflecting the light beam B come from the first portion 142 and/or the light beam B directly propagated to the protrusion portion PUa to the dark area above the second surface S2, the third distance A3 is smaller than a half of the second distance A2. Moreover, in order to avoid a situation that the protrusion portion PUa shields the light beam B come from the first portion 142 to cause inadequate brightness of the optical film 110 at the region corresponding to the first end X1, the distance between the vertex of the protrusion portion PUa and the optical film 110 is substantially identical to the distance between the optical film 110 and the end X4 of the first portion 142 adjacent to the protrusion portion PUa. In the embodiment, a protrusion height H of the protrusion portion PUa is, for example, within a range between 1 mm and 2 mm, and a width W of the protrusion portion PUa on the bottom reflector 120A is, for example, within a range between 5 mm and 10 mm.

In summary, the light source module of the invention may have at least one of the following advantages. Since the light source module of the invention is unnecessary to use the light guide plate and the secondary optical lens, the light source module has a thin thickness and lower cost. Moreover, based on the design of the third portion of the light converging element in the light source module of the invention, a part of the light beam come from the light emitting element and/or the second portion is shielded, so as to decrease a chance that the light beam directly emits out from the region of the optical film close to the light emitting element. Therefore, under the relatively thin thickness, the light source module of the invention can mitigate the bright band problem occurred at the region of the optical film close to the light emitting element due to direct emission of the light beam. In addition, through the design of the oblique second surface of the third portion of the light converting element, the width of the frame border is further decreased to achieve the slim border effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light source module, comprising:
an optical film;
a bottom reflector, located under the optical film;
a top reflector, located at a side of the bottom reflector and the optical film;
a light converging element, located at another side of the bottom reflector and the optical film relative to the top reflector, wherein the optical film, the bottom reflector, the top reflector, and the light converging element enclose a space, a direction from the top reflector to the light converging element is defined as a reference direction, the light converging element has a first portion, a second portion, and a third portion, the first portion and the second portion respectively extend from one side of the bottom reflector and one side of the optical film along the reference direction, and are connected to each other at a side away from the top reflector, the third portion is connected to a surface of the second portion adjacent to the optical film, and the third portion protrudes towards the first portion from the surface; and
a light emitting element, disposed in the space and located beside a junction of the first portion and the second portion, and having an optical axis direction, wherein the third portion has a first surface facing the first portion, a first angle is included between the optical axis direction and a connection line between the light emitting element and one end of the first surface away from the light emitting element, and the first angle is within a range between 5 degrees and 10 degrees.

2. The light source module as claimed in claim 1, wherein the end of the first surface away from the light emitting element is spaced by a first distance from the light emitting element along a direction parallel to the optical axis direction, and one end of a surface of the first portion facing the third portion adjacent to the bottom reflector is spaced by a second distance from the light emitting element along the direction parallel to the optical axis direction, and a ratio between the first distance and the second distance is within a range of 0.5 to 1.

3. The light source module as claimed in claim 1, wherein a second angle is included between the optical axis direction and a connection line between the light emitting element and one end of a surface of the first portion facing the third portion adjacent to the bottom reflector, and the second angle is within a range between 10 degrees and 20 degrees.

4. The light source module as claimed in claim 1, wherein the first surface is composed of one or a plurality of planes, composed of one or a plurality of curved surfaces, or composed of at least one plane and at least one curved surface.

5. The light source module as claimed in claim 1, wherein the first surface is a light absorbing surface, a diffusion surface, a specular surface or a combination of at least two of the above surfaces.

6. The light source module as claimed in claim 1, wherein the third portion further has a second surface connected to the first surface and facing the top reflector, wherein an acute angle is included between the second surface and the optical film, and the second surface is located between the first surface and the optical film.

7. The light source module as claimed in claim 6, wherein the second surface is a diffusion surface, a specular surface or a combination thereof.

8. The light source module as claimed in claim 1, wherein the bottom reflector has a first end and a second end opposite to the first end, the second end is adjacent to the optical film, the light converging element is located at the first end, and the top reflector is located at the second end.

9. The light source module as claimed in claim 8, wherein the first end has at least one protrusion portion, and the protrusion portion protrudes towards the optical film.

10. The light source module as claimed in claim 9, wherein a distance between a vertex of the protrusion portion and the optical film is substantially identical to a distance between one end of the first portion adjacent to the protrusion portion and the optical film.

11. The light source module as claimed in claim 10, wherein a protrusion height of the protrusion portion is within a range of 1 mm to 2 mm, and a width of the protrusion portion on the bottom reflector is within a range of 5 mm to 10 mm.

12. The light source module as claimed in claim 9, wherein one end of a surface of the first portion facing the third portion adjacent to the bottom reflector is spaced by a second distance from the light emitting element along a direction parallel to the optical axis direction, the vertex of the protrusion portion is spaced by a third distance from the end of the surface of the first portion facing the third portion adjacent to the bottom reflector along the direction parallel to the optical axis direction, and the third distance is smaller than a half of the second distance.

13. The light source module as claimed in claim 1, wherein the optical film comprises at least one diffusion sheet.

14. The light source module as claimed in claim 1, wherein the space is filled with air.

15. The light source module as claimed in claim 1, wherein an angle included between the top reflector and the optical film within the space is between 90 degrees and 100 degrees.

16. The light source module as claimed in claim 1, wherein a first section line of the surface of the first portion and a second section line of the surface of the second portion facing each other on a reference plane formed by the optical axis direction and a direction perpendicular to the optical film are non-spherical curves, and both of the first section line and the second section line satisfy an equation:

$$z = \frac{y^2/R}{1 + \sqrt{1-(1+K)y^2/R^2}} + \sum_{n=2}^{10} A_{2n} y^{2n},$$

wherein a z-direction is the optical axis direction, a y-direction is a direction perpendicular to the optical film, K is a spherical coefficient, R is a radius of curvature, $A_{2n}$ is a coefficient of $y^{2n}$, and n is a positive integer greater than or equal to 2 and smaller than or equal to 10, and R is a non-zero constant.

17. The light source module as claimed in claim 16, wherein K in the equation is within a range between −1 and −10, and $A_4$ is within a range between 0 and 0.1.

\* \* \* \* \*